United States Patent
Schreck et al.

(10) Patent No.: US 12,198,737 B1
(45) Date of Patent: Jan. 14, 2025

(54) TEMPERATURE CONTROL OF A LASER DIODE BY APPLYING REVERSE BIAS IN A DATA STORAGE DEVICE CONFIGURED FOR HEAT-ASSISTED MAGNETIC RECORDING

(71) Applicant: Western Digital Technologies, Inc., San Jose, CA (US)

(72) Inventors: Erhard Schreck, San Jose, CA (US); Sukumar Rajauria, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/460,376

(22) Filed: Sep. 1, 2023

(51) Int. Cl.
*G11B 5/48* (2006.01)
*G11B 5/012* (2006.01)
*G11B 7/126* (2012.01)
*G11B 5/00* (2006.01)

(52) U.S. Cl.
CPC ............ *G11B 5/4866* (2013.01); *G11B 5/012* (2013.01); *G11B 7/126* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,487,059 A * | 1/1996 | Saito | ................. | G11B 11/10595 |
| 5,703,855 A * | 12/1997 | Kirino | ................. | G11B 7/0045 |
| 5,742,566 A * | 4/1998 | Imai | ................. | G11B 11/10595 |
| 5,905,695 A * | 5/1999 | Kimura | ................. | G11B 7/126 |
| 8,675,455 B1 * | 3/2014 | Krichevsky | ............ | G11B 5/314 |
| | | | | 360/59 |
| 2009/0059978 A1 * | 3/2009 | Nagashima | ............ | G11B 7/126 |
| | | | | 372/38.07 |
| 2016/0087402 A1 * | 3/2016 | Tatah | ................. | H01S 5/0651 |
| | | | | 372/34 |
| 2017/0316804 A1 * | 11/2017 | Ma | .................... | G11B 5/455 |

* cited by examiner

*Primary Examiner* — Peter Vincent Agustin
(74) *Attorney, Agent, or Firm* — Neugeboren O'Dowd PC

(57) ABSTRACT

A data storage device includes a laser diode that heats an area of a disk near the read/write head. To mitigate mode hopping, the laser diode is preheated using the laser diode itself, such as by applying a reverse bias to the laser diode, during an interruption in writing of data to the disk. The laser diode is preheated to a temperature that maintains operation of the laser diode within a middle portion of a preselected gain mode and away from abrupt shifts in gain modes.

20 Claims, 8 Drawing Sheets

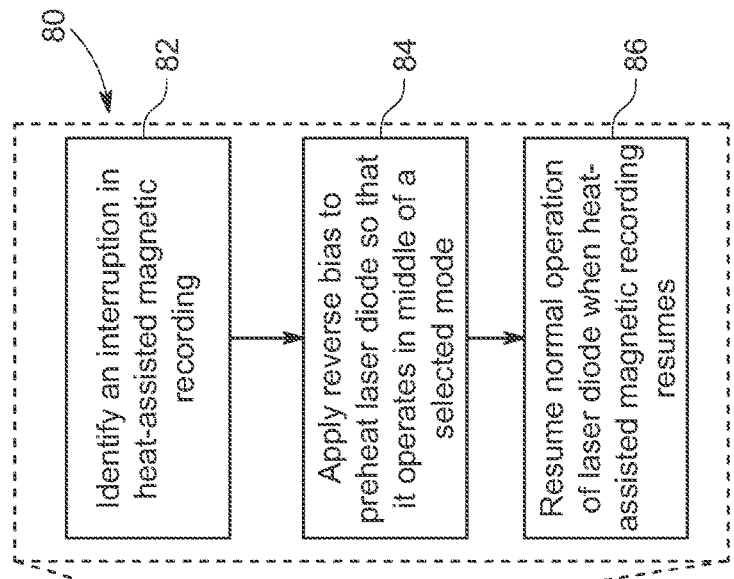
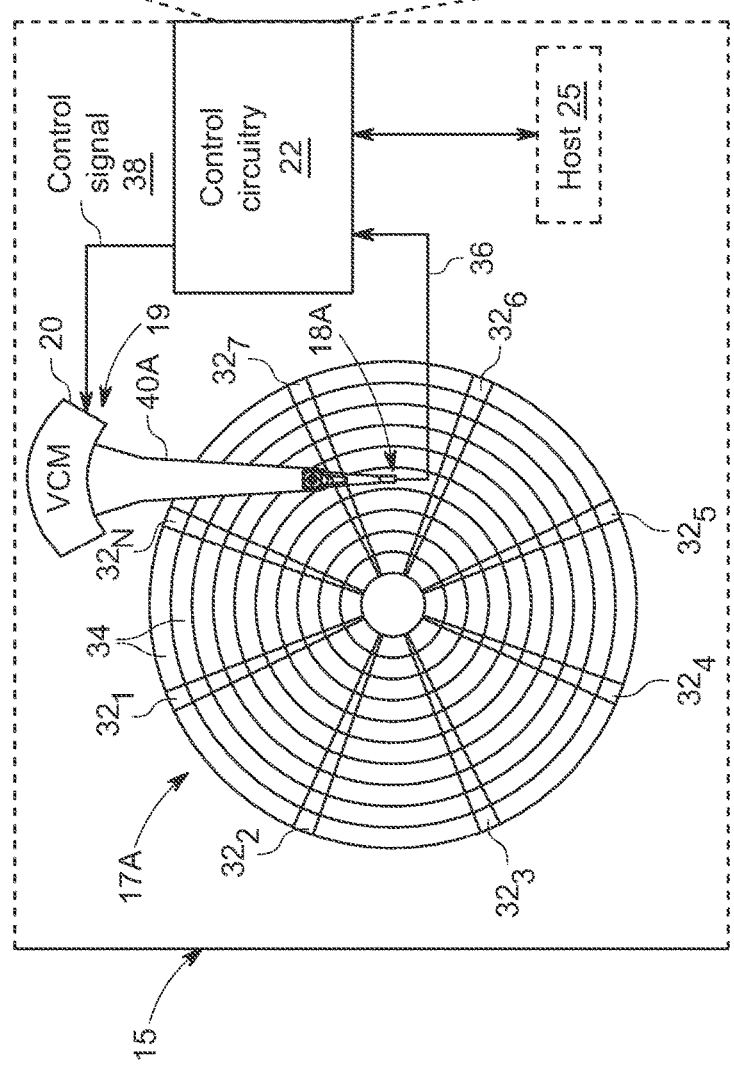
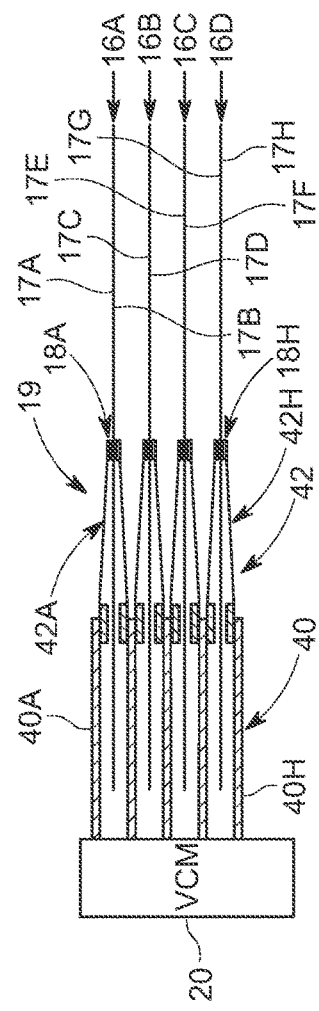

TEMPERATURE CONTROL OF A LASER DIODE BY APPLYING REVERSE BIAS IN A DATA STORAGE DEVICE CONFIGURED FOR HEAT-ASSISTED MAGNETIC RECORDING

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 is a conceptual diagram of a prior art disk format 2 comprising a number of radially-spaced, concentric servo tracks 4 defined by servo wedges $6_0$-$6_N$ recorded around the circumference of each servo track. A plurality of concentric data tracks are defined relative to servo tracks 4, wherein the data tracks may have the same or a different radial density (e.g., tracks per inch (TPI)) than servo tracks 6. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head positioning information is processed to position a head over a target data track during a seek operation, and servo bursts 14 provide fine head position information used for centerline tracking while accessing a data track during write/read operations. A position error signal (PES) is generated by reading servo bursts 14, wherein the PES represents a measured position of the head relative to a centerline of a target servo track. A servo controller processes the PES to generate a control signal applied to one or more actuators to actuate the head radially over the disk in a direction that reduces the PES.

The description provided in this background section should not be assumed to be prior art merely because it is mentioned in or associated with this background section. The background section may include information that describes one or more aspects of the subject technology.

SUMMARY

The following summary relates to one or more aspects and/or embodiments disclosed herein. It should not be considered an extensive overview relating to all contemplated aspects and/or embodiments, nor should it be regarded to identify key or critical elements relating to all contemplated aspects and/or embodiments or to delineate the scope associated with any particular aspect and/or embodiment. Accordingly, the following summary has the sole purpose of presenting certain concepts relating to one or more aspects and/or embodiments relating to the mechanisms disclosed herein in a simplified form to precede the detailed description presented below.

Ever-increasing demand for data storage necessitates higher-capacity hard drives, pushing beyond the superparamagnetic limit of traditional magnetic recording methods where data loss can occur due to thermal fluctuations. Heat-assisted magnetic recording (HAMR) counters this by using a laser diode to briefly reduce the coercivity of the disk's magnetic material, allowing denser data writing. However, HAMR faces the issue of "mode hopping," where temperature changes in the laser diode cause it to switch between different lasing modes, leading to variations in output power and wavelength. This can cause inconsistent heating, compromise the reliability of data recording, and reduce heating effectiveness if the new wavelength mismatches the HAMR head's optimized wavelength. Hence, effective temperature management of the laser diode is crucial for reliable HAMR operation.

Some aspects of this disclosure are directed to a data storage device comprising a disk, a read/write head configured to read data from and write data to the disk, and a laser diode configured to heat an area of the disk near the read/write head. One or more processing devices are configured to identify an interruption in writing of data to the disk and to preheat the laser diode using the laser diode itself during the interruption.

Other aspects of this disclosure are directed to a method for mitigating mode hopping in a data storage device configured for heat-assisted magnetic recording using a laser diode. The method comprises identifying an interruption in writing of data and preheating the laser diode using the laser diode itself during the interruption.

Further aspects of this disclosure are directed to one or processing devices comprising means for identifying an interruption in writing of data to a disk in a data storage device configured for heat-assisted magnetic recording using a laser diode, and means for preheating the laser diode using the laser diode itself during the interruption.

In some implementations, the laser diode is preheated by applying a reverse bias to the laser diode during the interruption. The reverse bias applied to the laser diode may be determined based on an expected temperature rise when writing data to the disk resumes, and application of the reverse bias to the laser diode may be stopped when writing of data to the disk resumes.

In some implementations, the laser diode is preheated to a temperature that maintains operation of the laser diode within a middle portion of a preselected gain mode and away from abrupt shifts in gain modes.

In some implementations, the interruption is a track seek operation in which the read/write head is transitioned to a different track on the disk.

In some implementations, preheating of the laser diode is initiated prior to beginning writing of data to the disk.

Various additional aspects of this disclosure are depicted in the accompanying drawing figures and described below and will be further apparent based thereon.

BRIEF DESCRIPTION OF THE DRAWINGS

Various features and advantages of the technology of this disclosure will be apparent from the following description of particular examples of those technologies, and as illustrated in the accompanying drawings. The drawings are not necessarily to scale; emphasis instead is placed on illustrating the principles of the technological concepts. In the drawings, like reference characters may refer to the same parts throughout different views. The drawings depict only illustrative examples of this disclosure and are not limiting in scope.

FIGS. 2A and 2B are conceptual block diagrams of a top view and a side view of a data storage device in the form of a disk drive, according to aspects of this disclosure.

FIG. 2C is a flow diagram of a method that a data storage device may perform, execute, and implement, according to aspects of this disclosure.

DETAILED DESCRIPTION

Figure 1:
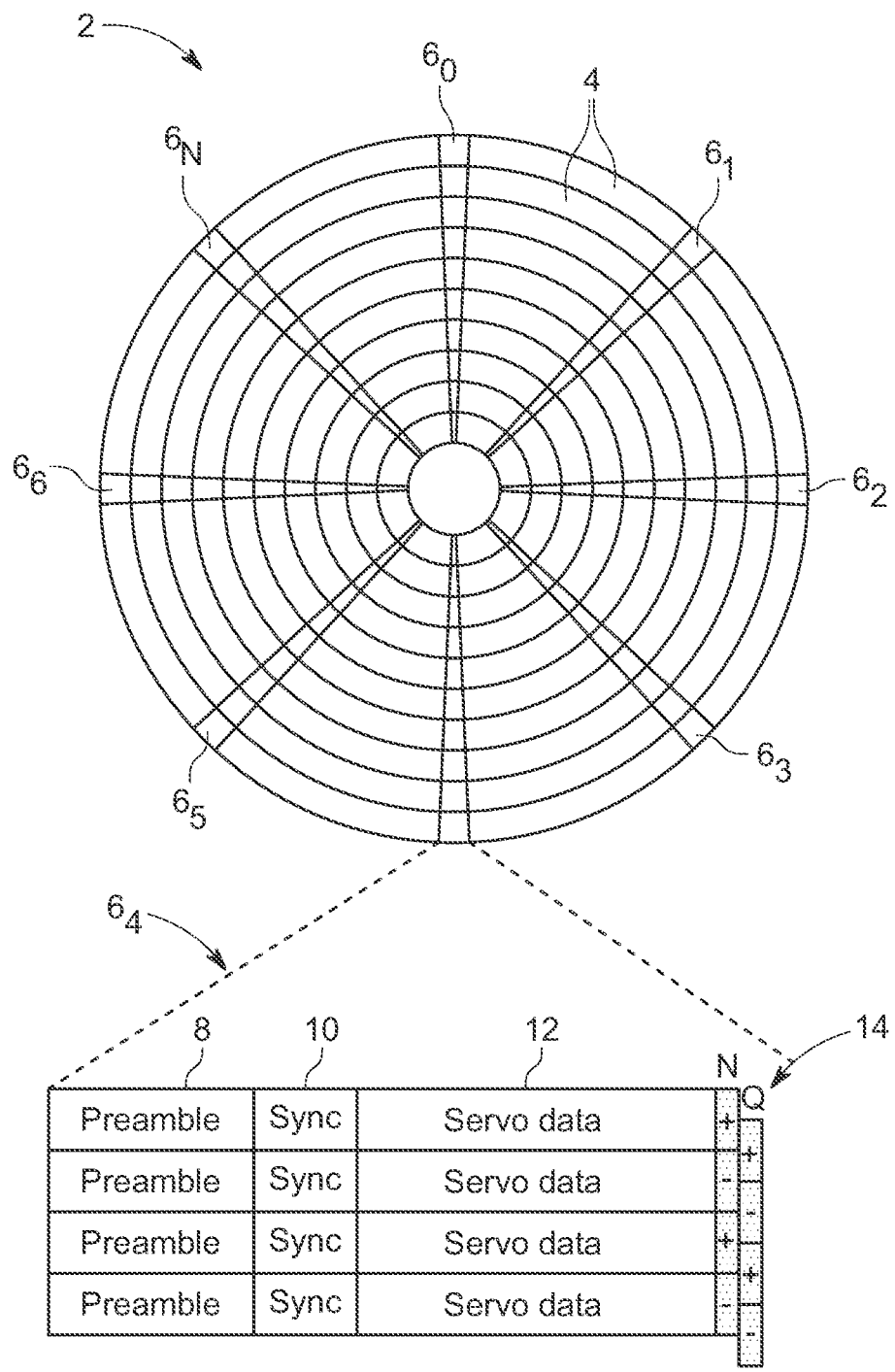
FIG. 1 is a conceptual diagram of a disk format comprising a number of radially-spaced, concentric servo tracks defined by servo wedges recorded around the circumference of each servo track, according to aspects of this disclosure.

The word "exemplary" is used herein to mean "serving as an example, instance, or illustration." Any embodiment described herein as "exemplary" should not be construed as preferred or advantageous over other embodiments.

The embodiments described below are not intended to limit this disclosure to the precise form disclosed, nor are they intended to be exhaustive. Rather, they are presented to provide a description so that others skilled in the art may utilize their teachings. Technology continues to develop, and elements of the described and disclosed embodiments may be replaced by improved and enhanced items. However, the teachings of this disclosure inherently disclose elements used in embodiments incorporating technology available at the time of this disclosure.

The demand for data storage continues to increase rapidly, driving the need for hard drives that can store more data in the same physical space. However, traditional magnetic recording techniques face a physical limit known as the superparamagnetic limit. This is the point at which magnetic bits become so small that thermal fluctuations can cause them to spontaneously change state, leading to data loss. Heat-assisted magnetic recording (HAMR) is a technology developed to address this issue. HAMR overcomes the superparamagnetic limit by using heat to temporarily reduce the coercivity (resistance to changes in magnetization) of the magnetic material on the disk. This is achieved by using a laser diode to heat a small area of the disk, enabling data to be written at a higher density to that area. As the heated area cools, its coercivity returns to its original high level, effectively "locking" the data into place. HAMR allows for much higher data densities than traditional magnetic recording techniques, as it allows data bits to be written much more closely together without the risk of thermal instability.

In HAMR, a phenomenon known as "mode hopping" occurs when the laser diode used for heating the magnetic material switches, or "hops," between different lasing modes. Each mode corresponds to a different pattern of standing waves within the laser diode's cavity, which in turn corresponds to a specific wavelength of emitted light. Mode hopping in HAMR can be induced by temperature variations in the laser diode. As the laser diode operates, it naturally generates heat. Factors such as power input, operation duty cycle, ambient temperature, and effectiveness of heat dissipation mechanisms can all affect the temperature of the diode. As the laser diode temperature changes, it impacts the refractive index and physical dimensions of the laser cavity, potentially leading to a shift in the lasing wavelength. When this shift causes the laser to switch from one mode to another, this is referred to as mode hopping.

Mode hopping can have several negative consequences in the context of HAMR. Mode hopping can cause sudden changes in the laser's output power and frequency, leading to variations in the heating of the magnetic material. This can result in inconsistent performance and potentially affect the reliability of the data recording process. Moreover, the optical components in the HAMR head may be optimized for a specific wavelength. If mode hopping causes the laser to emit light at a different wavelength, this could reduce the effectiveness of the heating process. Effective temperature management of the laser diode is critical to mitigate mode hopping and to maintain reliable operation of the HAMR system.

FIGS. 2A and 2B are conceptual top and side views of a data storage device in the form of disk drive 15, in accordance with aspects of this disclosure. Disk drive 15 comprises control circuitry 22, actuator assembly 19, and a plurality of hard disks 16 (i.e., disks 16A, 16B, 16C, 16D). FIG. 2C is a flow diagram of a method 80 that control circuitry 22 of disk drive 15 may perform or execute in controlling the operations of disk drive 15, including the operations of HAMR components on heads 18 (e.g., heads 18A-18H) disposed on actuator assembly 19, as further described below. In particular, method 80 mitigates laser diode mode hopping during heat assisted magnetic recording, as will be described in detail below. Actuator assembly 19 is configured to position one or more heads 18 over disk surfaces 17 of one or more disks 16. Heads 18 comprise write and read elements, configured for writing and reading control features and data to and from a corresponding disk surface 17 of disks 16.

Actuator assembly 19 comprises primary actuator 20 (e.g., a voice coil motor ("VCM")) and a number of actuator arms 40 (e.g., topmost actuator arm 40A, as seen in FIGS. 2A-2B). Each actuator arm 40 comprises a head 18 at a distal end thereof (e.g., head 18A at a distal end of topmost actuator arm 40A in FIGS. 2A-2B). Each actuator arm 40 is configured to suspend a head 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include a wide variety of other numbers of hard disks and disk surfaces, other numbers of actuator assemblies and primary actuators, and other numbers of fine actuators on each actuator arm than those illustrated in FIGS. 2A-2B.

FIG. 2A also depicts servo sectors 32 (e.g., servo sectors 32₁ through 32N) written onto disk surfaces 17. Servo sectors 32 may be written to disk surfaces 17 to define a plurality of evenly-spaced, concentric tracks 34. Each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align a head 18 with and relative to a particular track 34. Each track 34 includes a plurality of embedded servo sectors 32 utilized in seeking and track following. Servo sectors 32 are spaced sequentially around the circumferences of circumferential tracks 34 and extend radially outward from the inner diameter (ID) of disk surface 17. Servo sectors 32 contain servo information utilized in seeking and track following and are interspersed between data regions on disk surfaces 17. Data is conventionally written in the data regions in a plurality of discrete data sectors. Each data region is typically preceded by a servo sector 32.

Control circuitry 22 may also process a read signal 36 emanating from head 18A to demodulate servo data written on the disk (e.g., servo sectors 32) to generate a position error signal (PES) representing an error between the actual position of the head and a target position relative to a target track. Control circuitry 22 may process the PES using a suitable servo control system to generate control signal 38 (e.g., a VCM control signal) applied to VCM 20 which rotates actuator arm 40 about a pivot in order to actuate head 18 radially over disk surface 17 in a direction that reduces the PES. In some embodiments, disk drive 15 may also comprise a suitable micro actuator, such as a suitable piezoelectric (PZT) element for actuating head 18 relative to a suspension, or for actuating a suspension relative to actuator arm 40.

Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

Each read/write head 18 is conventionally embedded in the trailing edge of a component known as a slider. The slider in turn is affixed to a suspension, which is found at the terminating end of actuator arm 40. As disk 16 spins at a high speed, the slider is lifted, or 'flies', above disk 16. It hovers on a thin layer of air, maintaining a stable distance measured in nanometers from disk surface 17. This minuscule distance permits read/write heads 18 to retrieve or store data while avoiding direct physical contact with disk surface 17, thereby preventing data corruption and potential damage to disk surface 17.

Figure 3:
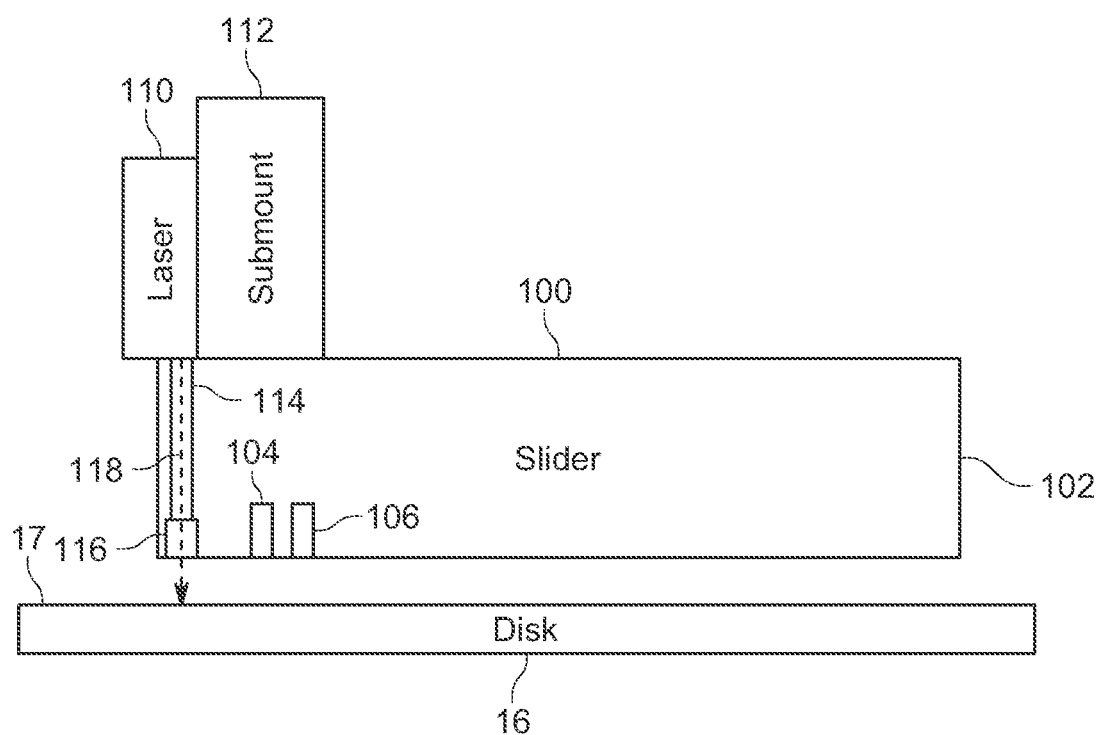
FIG. 3 is a conceptual block diagram of a slider configured with a laser diode for heat-assisted magnetic recording (HAMR), according to aspects of this disclosure.

FIG. 3 is a conceptual block diagram of a slider 100 hovering over surface 17 of disk 16, according to aspects of this disclosure. Slider 100 includes write element 104 and read element 106, which are integral components of read/write head 18, positioned along bottom air bearing surface (ABS) 102 of slider 100 for writing information to and reading information from disk 16. Write element 104 generates a magnetic field that, when directed towards disk 16, alters the magnetic orientations of an area of disk surface 17, thereby recording data. Read element 106 senses these magnetic orientations, translating them back into readable digital information.

Slider 100 is also configured with HAMR components including laser diode 110 attached to sub-mount 112. Laser diode 110 typically comprises multiple layers of semiconducting materials, such as gallium arsenide. When energized, electrons and holes within these layers combine, emitting energy in the form of light. The semiconducting materials are configured in a cavity between mirrors that reflect the emitted light, which is then focused by a lens. Laser diode 110 typically operates in the wavelength range of about 700 nm to about 900 nm. Light 118 emitted by laser diode 110 is coupled into waveguide 114 to near-field transducer (NFT) 116 in the vicinity of write element 104. Upon receiving light 118 from laser diode 110, NFT 116 generates localized heat energy that heats an area of disk 16 near write element 104, enabling data to be written at a higher density to that temporarily heated area. It should be noted that FIG. 3 is merely one example of a slider configured with a laser diode for heat-assisted magnetic recording, and that slider 100 may be configured in other ways so long as it is equipped with a laser diode configured to heat an area of disk 16.

When laser diode 110 is activated, the produced light output—comprised of photons—tends to occur at a specific wavelength, determined by factors such as the design of the laser cavity and the lens. However, the precise wavelength of the laser output is not a static property; it is influenced by the temperature of the laser diode and the ambient system temperature. Temperature variations can arise from many sources, including heat generated by the laser diode itself and changes in environmental conditions.

Figure 4:
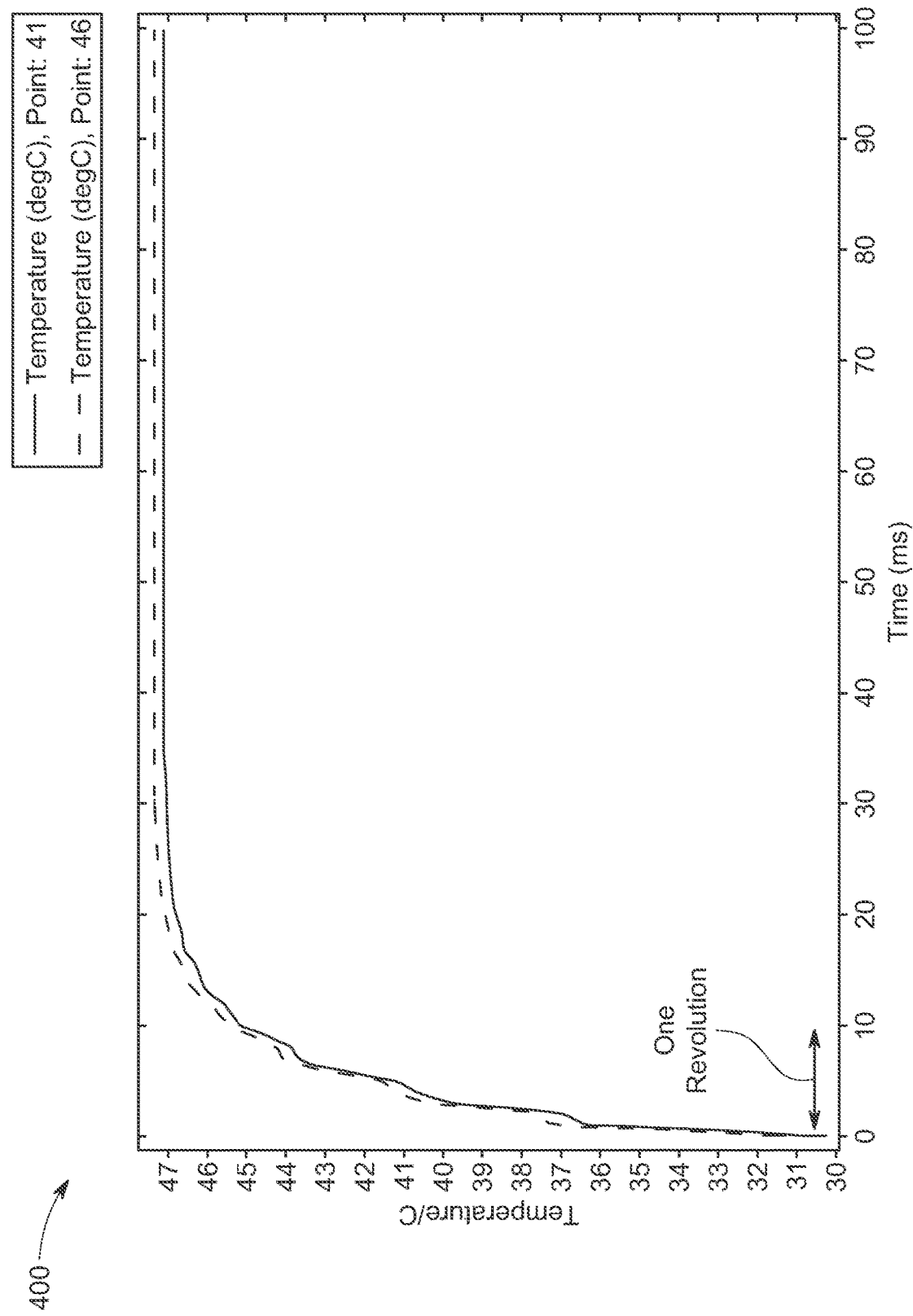
FIG. 4 is a graph illustrating increase in laser diode cavity temperature over time during HAMR, according to aspects of this disclosure.

FIG. 4 is a graph 400 illustrating the increase in laser diode cavity temperature over time during heat-assisted magnetic recording, according to aspects of this disclosure. As shown in FIG. 4, the temperature of laser diode 110 can experience a substantial change—an increase of approximately 15 degrees—over a single revolution of disk 16 when utilizing heat-assisted magnetic recording. In the example of FIG. 4, a single revolution of disk 16 takes about 8-10 ms, but this time may vary depending on the rotational speed (RPM) of disk 16. As also shown in FIG. 4, the temperature of laser diode 110 starts to level off and becomes constant after about two revolutions of disk 16. Again, this time may vary depending on the rotational speed of disk 16.

However, during normal operation of disk drive 15, the laser diode temperature does not simply level off after several revolutions to eliminate the issue of temperature fluctuations. Rather, in addition to the fairly dramatic temperature increase of laser diode 110 that can occur over a single disk revolution, an equally dramatic temperature decrease of laser diode 110 may occur during a track seek in which laser diode 110 is turned off. A track seek refers to the operation of moving the read/write head to a different track on the disk, which is typically performed often and whenever the drive needs to read or write data that is not on the current track where the read/write head is located.

Figure 5:
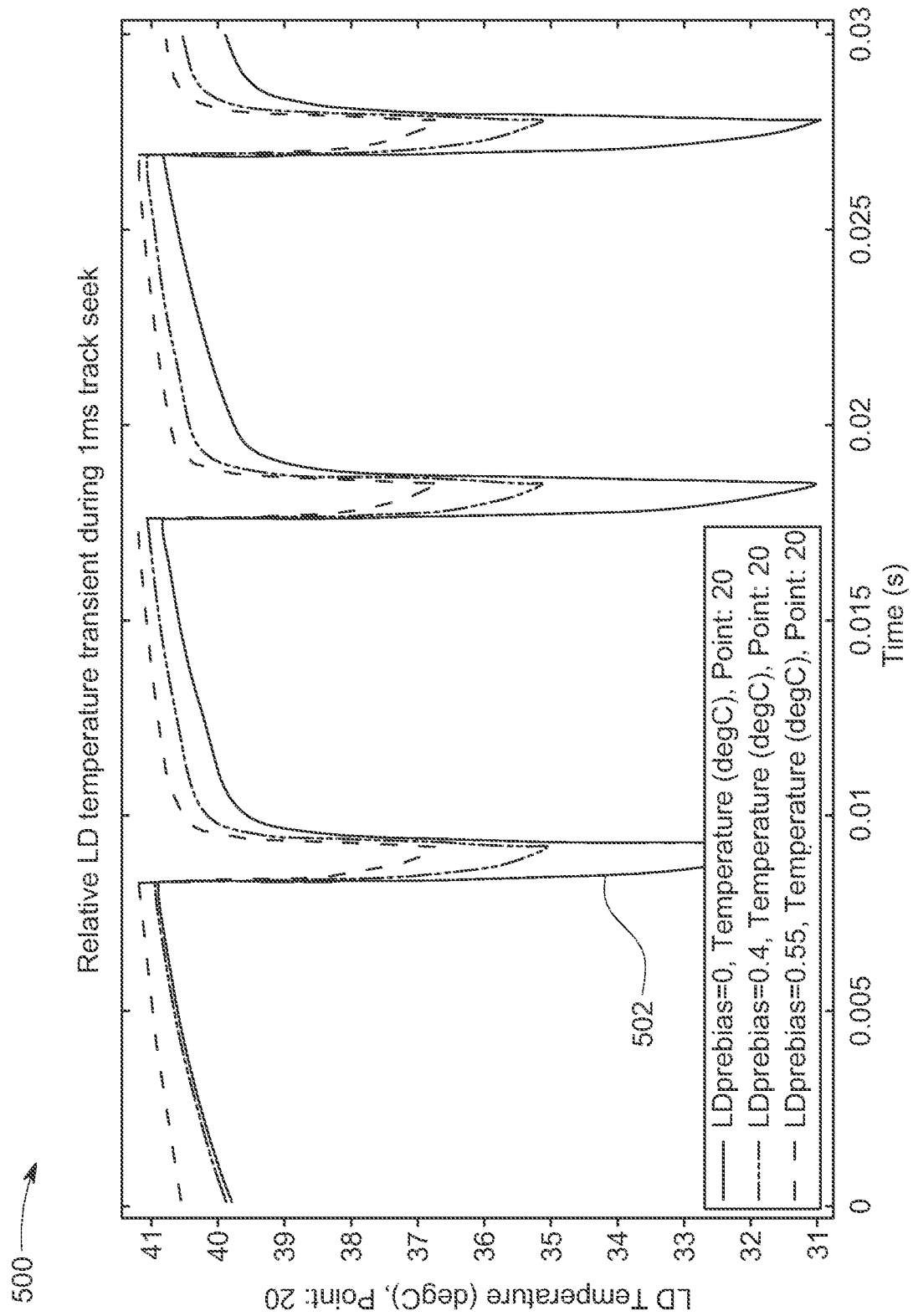
FIG. 5 is a graph illustrating changes in laser diode cavity temperature during a track seek, according to aspects of this disclosure.

In this regard, FIG. 5 is a graph 500 illustrating changes in laser diode cavity temperature during a track seek, according to aspects of this disclosure. In the example of FIG. 5, a track seek lasting about 1 ms is performed following every disk revolution lasting about 8 ms. Temperature curve 502 represents a scenario where laser diode 110 is turned on for heat-assisted magnetic recording during the disk revolution of about 8 ms and is then turned off during the track seek of about 1 ms. As can be seen in temperature curve 502, each precipitous rise in the temperature of laser diode 110 during a disk revolution (about 10 degrees in the example of FIG. 5) is followed by an equally precipitous drop in the temperature of laser diode 110 during a track seek (about 10 degrees in the example of FIG. 5). Thus, the alternating operations of disk revolutions and track seeking leads to a situation where temperature fluctuations of laser diode 110 are frequent and ongoing.

Figure 6:
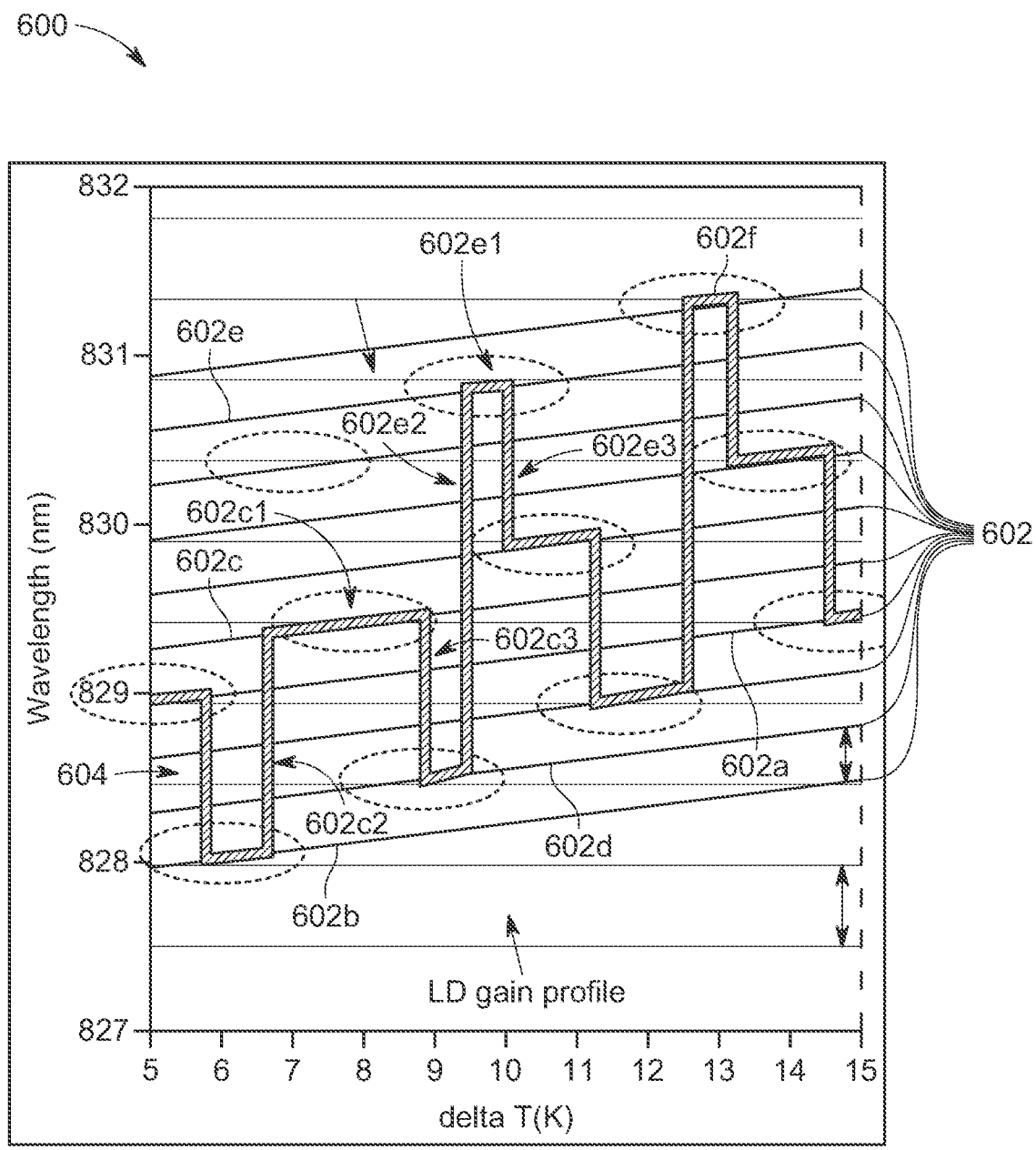
FIG. 6 is a graph illustrating the laser diode gain profile and mode hopping that occurs with variations in laser diode cavity temperature during HAMR, according to aspects of this disclosure.

These dramatic and ongoing temperature changes not only affect the output and efficiency of laser diode 110 but may also cause laser diode 110 to switch or "hop" between different wavelengths or modes, which is a phenomenon known as "mode hopping". In this regard, FIG. 6 is a graph 600 illustrating the gain profile of laser diode 110 over a disk revolution and mode hopping that occurs with variations in laser diode cavity temperature during heat assisted magnetic recording, according to aspects of this disclosure. In FIG. 6, the wavelength of the laser diode (measured in nanometers) is on the vertical axis and changes in temperature are on the horizontal axis.

The multiple discrete and relatively linear curves 602 in graph 600 represent how the wavelength of the emitted laser light changes with temperature variations. Each gain curve 602 in FIG. 6 represents a different mode of operation for the laser diode, which is characterized by a distinct emission wavelength. When the temperature changes, the emission wavelength of the laser diode shifts along one of these gain curves, causing the laser output to change. A smooth transition along a single gain curve 602 would result in a fairly reliable and steady output from laser diode 110. However, the dramatic and ongoing temperature changes experienced by laser diode 110 do not usually result in a smooth transition along a single gain curve. Rather, laser diode 110 is prone to abruptly shifting from one gain curve 602 to another, i.e., mode hopping. Mode hopping occurs when the changes in temperature push the diode's operating point past a boundary of a particular gain curve or mode 602, causing the diode to suddenly start operating on a different gain curve or mode 602.

In FIG. 6, the phenomenon of mode hopping is illustrated by mode hopping curve 604. As can be seen in FIG. 6, laser diode 110 begins in mode 602a, at a wavelength of about 829 nm. Laser diode 110 remains in mode 602a until a temperature change of about one degree has occurred, and then drops (mode hops) abruptly to mode 602b at a wavelength of about 828 nm. Laser diode 110 remains in mode 602b for again about one degree of temperature change, and then rises (mode hops) suddenly to mode 602c at a wavelength of slightly more than 829 nm. Laser diode 110 remains in mode 602c for a longer temperature change of about two degrees, and then drops precipitously to mode 602d at a wavelength of slightly more than 828 nm. Mode hopping continues in this fashion as temperature continues to change, with laser diode 110 remaining in some modes 602 over greater temperature variations and in some modes 602 over smaller temperature variations.

Mode hopping may induce unpredictable and sudden alterations in the output characteristics of laser diode 110, particularly with regard to the wavelength and power emitted. This can disrupt the heating process and introduce inconsistencies in performance, potentially compromising the reliability of the data recording process and resulting in errors during data recording. Inconsistent heating of the magnetic medium due to these fluctuations can lead to variations in the recorded magnetic patterns, making it challenging to retrieve the stored data accurately.

In order to address the challenges posed by mode hopping, method 80 of FIG. 2C aims to maintain continuous operation of laser diode 110 along a single linear gain curve or mode 602, thereby preventing hopping between multiple gain curves 602. Mode hopping mitigation method 80 ensures that laser diode 110 remains consistently positioned within the linear region of a specific gain mode or curve while avoiding the abrupt cliffs or transitions that trigger sudden shifts to different gain modes and induce mode hopping. Focusing on gain mode 602c of FIG. 6 as an example, method 80 ensures that laser diode 110 operates continuously in the middle portion of linear region 602c1 of gain curve 602c. By staying away from the abrupt transitions 602c2 and 602c3 on each side of linear region 602c1, mode hopping is mitigated. This is accomplished by applying a reverse bias to laser diode 110 during any interruptions in the recording process rather than simply turning it off. The reverse bias serves the purpose of preheating laser diode 110 to a temperature sufficient to offset the temperature rise that would otherwise occur during heat-assisted recording, as illustrated in FIG. 4. By preheating laser diode 110 via application of reverse bias, temperature fluctuations that could trigger mode hopping are mitigated.

Method 80 for mitigating mode hopping during heat assisted magnetic recording is illustrated in FIG. 2C. Method 80 may be performed, for example, by control circuitry 22. In some embodiments, control circuitry 22 may be implemented in the preamplifier of disk drive 15. The first step 82 involves identifying or waiting for an interruption in the heat assisted magnetic recording process. Such interruptions can occur under various circumstances, with one common instance being during a track seek operation. During a track seek operation, read/write head 18 is transitioned to a different track on the disk, temporarily interrupting the recording process. During the interruption, in step 84, a reverse bias is applied to laser diode 110 to preheat laser diode 110. A sufficient amount of reverse bias is applied to ramp up the temperature of laser diode 110 to a level that causes it to operate in the middle of a preselected mode 602. For example, with reference to FIG. 6, a reverse bias may be applied to preheat laser diode 110 so that it operates within the middle portion of linear region 602c1 of mode 602c. Operating in the middle portion of region 602c1 ensures that laser diode 110 stays clear of the critical regions or sudden drop-offs 602c2 and 602c3 that might precipitate an abrupt mode shift. The amount of reverse bias applied to laser diode 110 may be determined based on an expected temperature rise when writing data to disk 16 resumes. Once the interruption in recording is over, i.e., when head 18 has successfully positioned over the new track, application of reverse bias to laser diode 110 is stopped and heat assisted magnetic recording and normal operation of laser diode 110 resumes.

Through implementation of method 80, operation of laser diode 110 is strategically controlled to circumvent potential temperature instability and consequent mode hopping. Rather than allowing the temperature of laser diode 110 to fluctuate, laser diode 110 is intentionally preheated such that it always operates in the central linear region of a chosen mode. This buffers against minor temperature fluctuations that could potentially lead to drastic alterations in the wavelength and power output of laser diode 110. With each interruption in the writing process or before initiation of the writing process, the temperature of laser diode 110 is actively managed using laser diode 110 itself, in one example, by application of reverse bias to the laser diode.

Advantageously, no additional components such as an external heater are required to accomplish preheating of laser diode 110. As an alternative to applying reverse bias to laser diode 110, a method known as 'dark' laser heating may be used to preheat laser diode 110. Here, laser diode 110 consumes power and generates heat without significantly emitting photons, the particles responsible for light emission. In this scenario, laser diode 110 is driven at a current level below its lasing threshold, the point at which it begins to emit coherent light. Operating below this threshold, laser diode 110 predominantly performs as a simple diode, converting the electrical power it receives into heat instead of light. This allows laser diode 110 to warm up to a specific temperature without substantial light emission, hence the term 'dark' laser heating.

Certain wavelengths or modes may be preferred over others. For example, with reference to FIG. 6, mode 602c has a "lengthier" safe region 602c1 that can accommodate temperature changes of about two degrees, providing a greater margin for keeping operation of laser diode 110 away from critical regions 602c2 and 602c3 where mode hopping is prone to occur. By contrast, mode 602e has a shorter safe region 602e1 that can accommodate temperature changes of only about one degree or less, providing less margin for keeping operation of laser diode 110 away from critical regions 602e2 and 602e3 where mode hopping is prone to occur. Thus, in some cases, operation of laser diode 110 in mode 602c may be preferred to operation in mode 602e since there is a greater margin for staying in the safe region and avoiding mode hopping. However, there may be some situations in which operation in mode 602e is nevertheless preferred.

Figure 7:
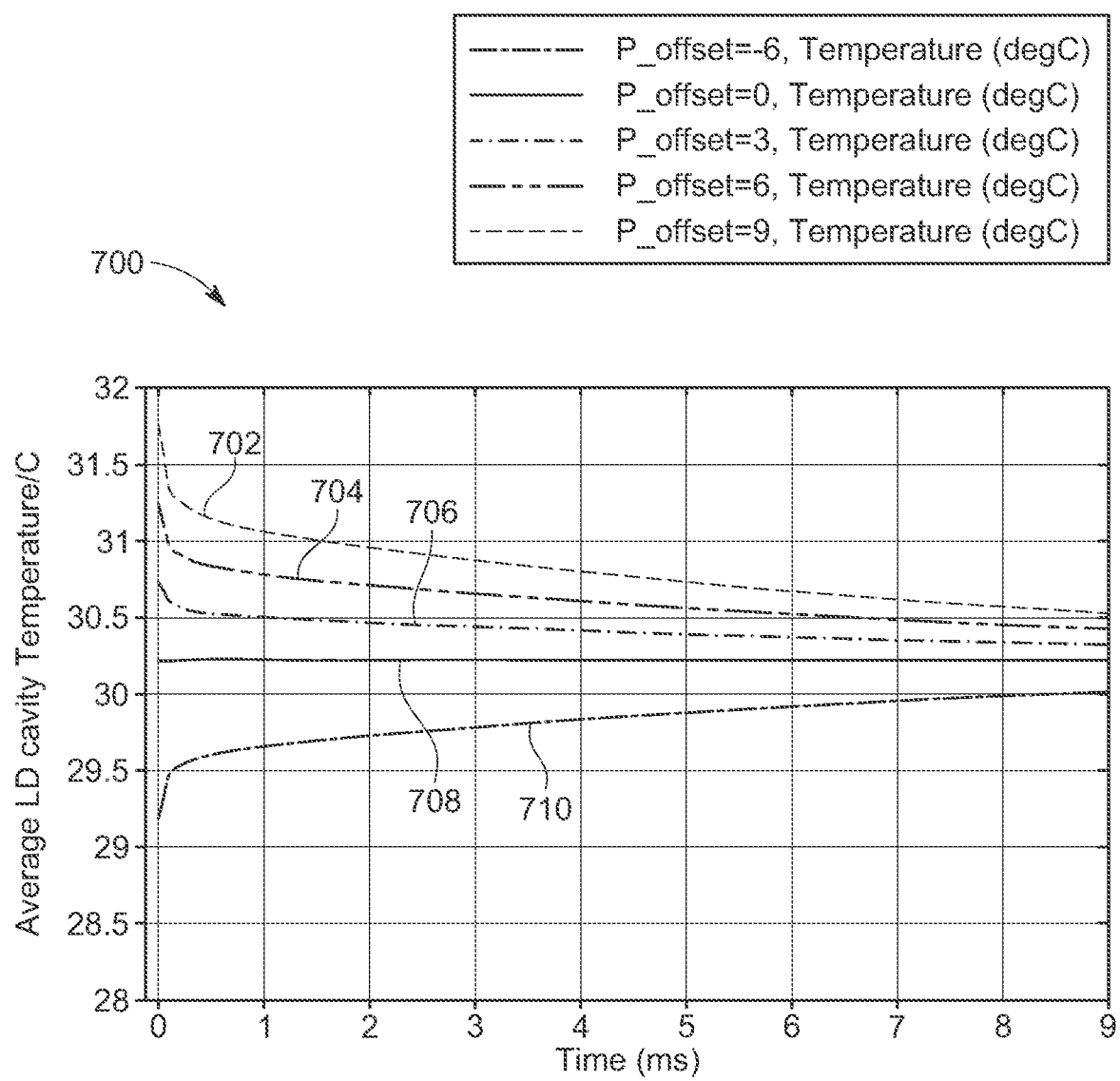
FIG. 7 is a graph illustrating the average laser diode cavity temperature over time at various levels of reverse bias preheating, according to aspects of this disclosure.

FIG. 7 is a graph 700 illustrating average laser diode cavity temperature over time at various levels of reverse bias preheating, according to aspects of this disclosure. The temperature curves 702, 704, 706, 708, and 710 shown in FIG. 7 show various preheating levels that are appropriate for operation in different gain modes such as the various modes 602 of FIG. 6. The amount of preheating required is determined in part based on the expected temperature rise when writing data to disk 16 resumes. Essentially, laser diode 110 should be preheated by an amount that offsets its expected temperature rise when data writing resumes. For operation in a mode that experiences a relatively high amount of expected temperature rise, such as mode 602f in FIG. 6 for example, the amount of preheating required will be higher, such as curve 702 in FIG. 7 for example. By contrast, for operation in a mode that experiences a relatively low amount of expected temperature rise, such as mode 602b in FIG. 6 for example, the amount of preheating required will be lower, such as curve 710 in FIG. 7 for example. FIG. 7 also shows that regardless of the level of preheating, over time, the average laser diode cavity temperature begins to approach a constant level.

Figure 8:
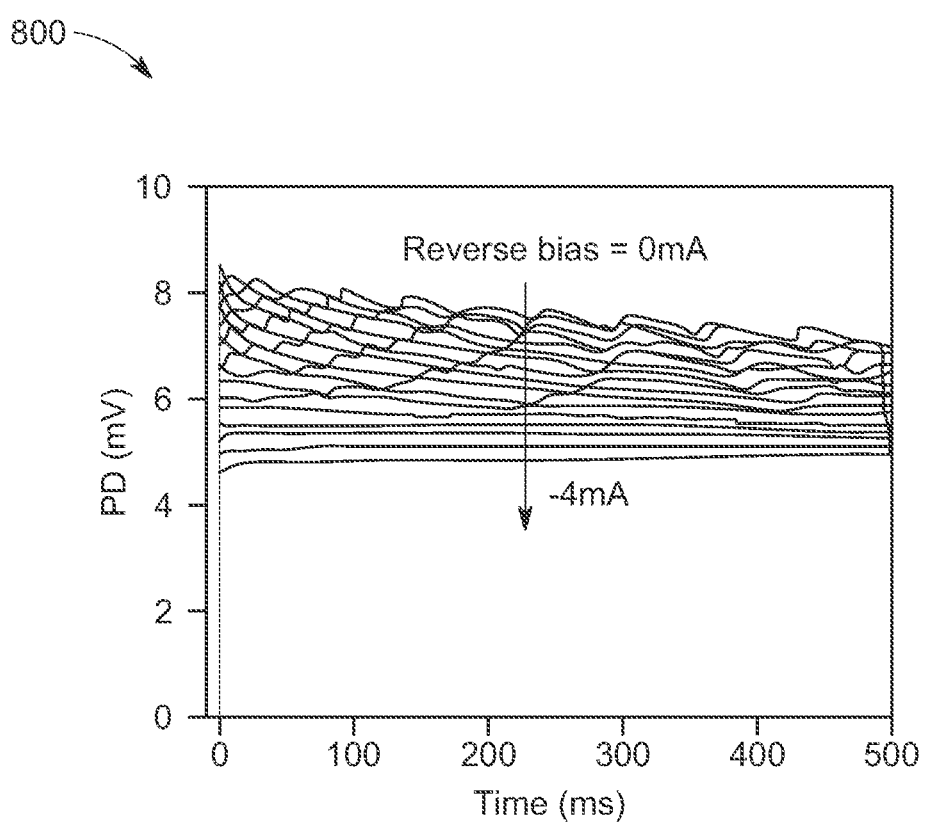
FIG. 8 is a graph illustrating the output power of the laser diode over time at various levels of reverse bias preheating, according to aspects of this disclosure.

FIG. 8 is a graph 800 illustrating the output power of the laser diode over time at various levels of reverse bias preheating, according to aspects of this disclosure. The curves at the very top portion of FIG. 8 represent application of no reverse bias (i.e., 0 mA). As expected, since laser diode 110 is not being preheated at all in this situation, there are many fluctuations that occur due to mode hopping and there is also a steady decrease in output power over time, which is not a desirable situation. As reverse bias is applied in steadily increasing amounts, fluctuations in output power begin to decrease, due to less mode hopping, and there is also less of a decrease over time in the amount of power that is output by laser diode 110. As reverse bias continues to increase, and approaches an amount of about −4 mA, mode hopping begins to be completely eliminated, and output power is steady with no fluctuations, which is a desirable situation. As can be seen in FIG. 8, the bottom 4-5 curves are completely steady with no fluctuations and no decrease in output power. Thus, a number of reverse bias settings and power levels can be selected in this region that allow operation in different modes 602 with little to no mode hopping or output power fluctuation.

Any suitable control circuitry (e.g., control circuitry 22 in FIG. 2A) may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). In addition, control circuitry 22 may include a preamp circuit implemented as a separate integrated circuit, integrated into the read channel or data storage controller circuit, or integrated into an SoC.

In some examples, the control circuitry, such as, but not limited to, control circuitry 22, comprises a microprocessor executing instructions, the instructions being operable to cause the microprocessor to perform the flow diagrams (e.g., shown in FIG. 2C) described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute control circuitry 22 as described herein and may perform one or more of the functions of control circuitry 22 as described herein. In various examples, control circuitry 22, or another processing device performing one or more of the functions of control circuitry as described herein, may be abstracted away from being physically proximate to the disks and disk surfaces. The control circuitry, or another processing device performing one or more of the functions of control circuitry as described herein, may be part of or proximate to a rack of or a unitary product comprising multiple data storage devices, may be part of or proximate to one or more physical or virtual servers, may be part of or proximate to one or more local area networks or one or more storage area networks, may be part of or proximate to a data center, or may be hosted in one or more cloud services.

In various examples, a disk drive, such as disk drive 15, may include a magnetic disk drive, an optical disk drive, a hybrid disk drive, or other types of disk drives. In addition, some examples may include electronic devices such as computing devices, data server devices, media content storage devices, or other devices, components, or systems that may comprise the storage media and/or control circuitry described above.

The various features and processes described above may be used independently of one another or may be combined in various ways. All possible combinations and subcombinations are intended to fall within the scope of this disclosure. In addition, certain method, event or process blocks may be omitted in some implementations. The methods and processes described herein are not limited to any particular sequence, and the blocks or states relating thereto can be performed in other sequences. For example, tasks or events may be performed in an order other than that specifically disclosed, or multiple tasks or events may be combined in a single block or state. The tasks or events may be performed in serial, in parallel, or in another manner. Tasks or events may be added to or removed from the disclosed examples. The systems and components described herein may be configured differently than described. For example, elements may be added to, removed from, or rearranged compared to the disclosed examples.

While certain embodiments are described herein, these embodiments are presented by way of example only, and do not limit the scope of this disclosure. Nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of this disclosure.

Method 80 and other methods of this disclosure may include other steps or variations in various other embodiments. Some or all of method 80 may be performed by or embodied in hardware, or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for using reverse bias to control the average temperature of a laser diode in a data storage device configured for heat-assisted magnetic recording. Those of skill in the art will be well-equipped by this disclosure with an understanding and an informed reduction to practice of a wide panoply of further applications, architectures, techniques, and methods using reverse bias to control the average temperature of a laser diode in a data storage device configured for heat-assisted magnetic recording, and other aspects of this disclosure encompassed by the present disclosure and by the claims set forth below.

As used herein, the recitation of "at least one of A, B and C" is intended to mean "either A, B, C or any combination of A, B and C." The disclosed examples are provided to enable any person skilled in the relevant fields of art to understand how to make or use the subject matter of this disclosure. Various modifications to these embodiments will be readily apparent to those skilled in the art based on this disclosure, and the generic principles defined herein may be applied to other examples without departing from the spirit or scope of this disclosure. Thus, this disclosure is not limited to the embodiments shown herein but is to be accorded the widest scope consistent with the principles and novel features disclosed herein.

This disclosure and many of its attendant advantages will be understood by the foregoing description, and various changes may be made in the form, construction, and arrangement of the components without departing from the disclosed subject matter or without sacrificing its material advantages. The form described is merely explanatory, and the following claims encompass and include a wide range of embodiments, including a wide range of changes in the form, construction, and arrangement of components as described herein.

While this disclosure has been described with reference to various examples, these examples are illustrative and the scope of the disclosure is not so limited. The subject matter described herein is presented in the form of illustrative, non-limiting examples, and not as exclusive implementations, whether or not they are explicitly called out as examples as described. Many variations, modifications, and additions are possible within the scope of the examples of the disclosure. More generally, examples in accordance with this disclosure have been described in the context of particular implementations. Functionality may be separated or combined in blocks differently or described with different terminology, without departing from the spirit and scope of this disclosure and the following claims. These and other variations, modifications, additions, and improvements may fall within the scope of this disclosure as defined in the following claims.

The invention claimed is:

1. A data storage device comprising:
a disk;
a read/write head configured to read data from and write data to the disk;
a laser diode configured to heat an area of the disk near the read/write head; and
one or more processing devices configured to:
identify an interruption in writing of data to the disk; and
preheat the laser diode during the interruption by applying a reverse bias to the laser diode, or by preheating the laser diode by a current level below a lasing threshold current when the laser diode begins to emit coherent light.

2. The data storage device of claim 1, wherein the one or more processing devices are configured to preheat the laser diode by applying the reverse bias to the laser diode during the interruption.

3. The data storage device of claim 2, wherein the one or more processing devices are further configured to determine the reverse bias applied to the laser diode based on an expected temperature rise when writing data to the disk resumes.

4. The data storage device of claim 2, wherein the one or more processing devices are further configured to stop application of the reverse bias to the laser diode when writing of data to the disk resumes.

5. The data storage device of claim 1, wherein the one or more processing devices are further configured to preheat the laser diode to a temperature that maintains operation of the laser diode within a middle portion of a preselected gain mode.

6. The data storage device of claim 1, wherein the one or more processing devices are further configured to preheat the laser diode to a temperature that maintains operation of the laser diode away from abrupt shifts in gain modes.

7. The data storage device of claim 1, wherein the interruption is a track seek operation in which the read/write head is transitioned to a different track on the disk.

8. The data storage device of claim 1, wherein the one or more processing devices are configured to preheat the laser diode by the current level below its lasing threshold current, a point at which it begins to emit coherent light.

9. The data storage device of claim 1, wherein the one or more processing devices are further configured to preheat the laser diode using the laser diode itself during the interruption by initiating preheating of the laser diode prior to beginning writing of data to the disk.

10. A method for mitigating mode hopping in a data storage device configured for heat-assisted magnetic recording using a laser diode, comprising:
identifying an interruption in writing of data; and
preheating the laser diode during the interruption by applying a reverse bias to the laser diode, or by preheating the laser diode by a current level below a lasing threshold current when the laser diode begins to emit coherent light.

11. The method of claim 10, further comprising:
preheating the laser diode by applying the reverse bias to the laser diode during the interruption.

12. The method of claim 11, further comprising:
determining the reverse bias applied to the laser diode based on an expected temperature rise when writing of data resumes.

13. The method of claim 11, further comprising:
stopping application of the reverse bias to the laser diode when writing of data resumes.

14. The method of claim 10, further comprising:
preheating the laser diode to a temperature that maintains operation of the laser diode within a middle portion of a preselected gain mode.

15. The method of claim 10, further comprising:
preheating the laser diode to a temperature that maintains operation of the laser diode away from abrupt shifts in gain modes.

16. The method of claim 10, wherein the interruption is a track seek operation in which a read/write head is transitioned to a different track on a disk.

17. The method of claim 10, further comprising:
preheating the laser diode by the current level below its lasing threshold current, a point at which it begins to emit coherent light.

18. The method of claim 10, further comprising:
initiating preheating of the laser diode prior to beginning writing of data.

19. One or processing devices comprising:
means for identifying an interruption in writing of data to a disk in a data storage device configured for heat-assisted magnetic recording using a laser diode; and
means for preheating the laser diode during the interruption by applying a reverse bias to the laser diode, or by preheating the laser diode by a current level below a lasing threshold current when the laser diode begins to emit coherent light.

20. The one or more processing devices of claim 19, further comprising:
means for preheating the laser diode by applying the reverse bias to the laser diode during the interruption.

* * * * *